United States Patent Office 3,530,380
Patented Sept. 22, 1970

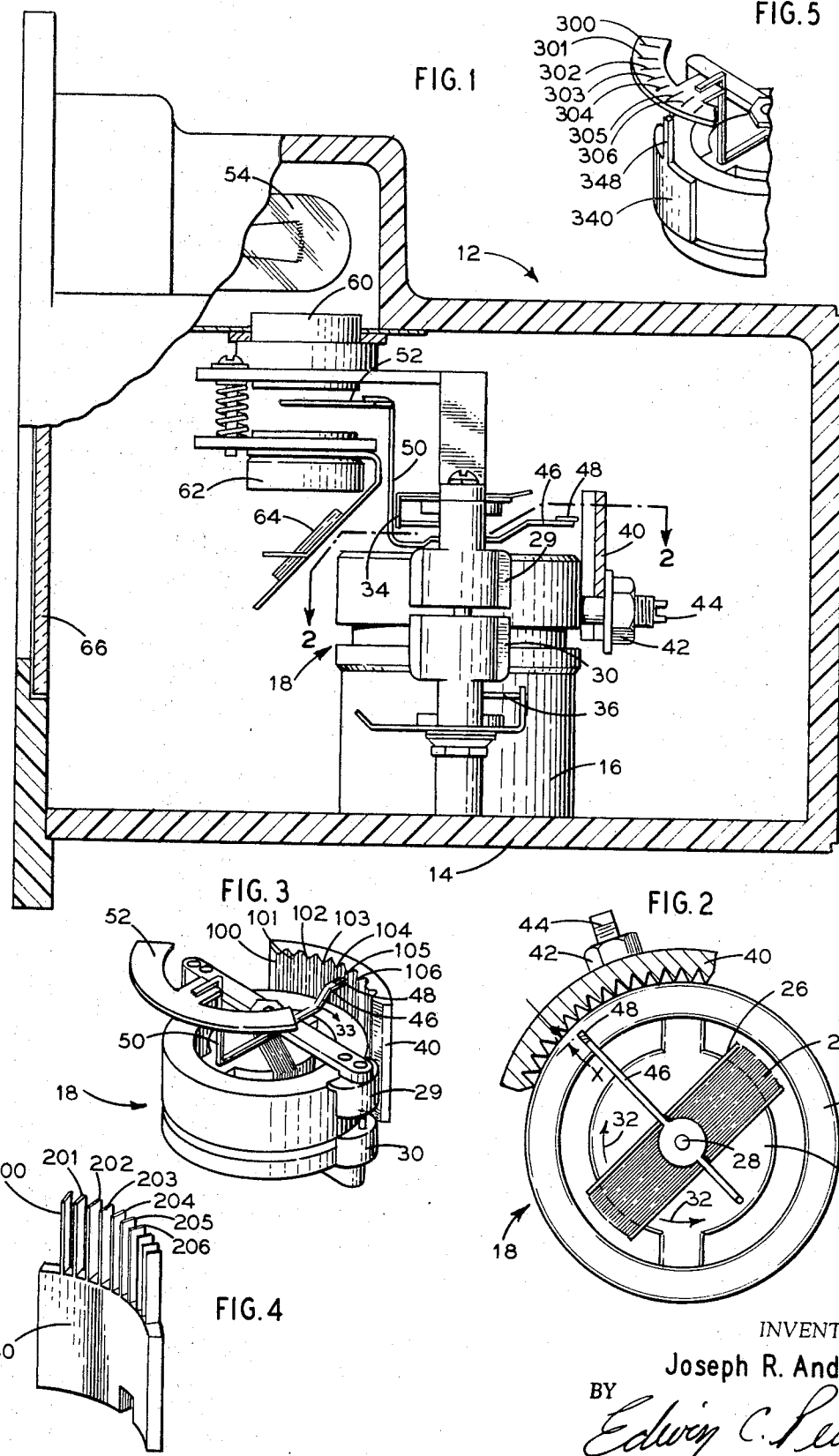

3,530,380
MOVING COIL INSTRUMENT HAVING A
MAGNETIC DETENT MECHANISM
Joseph R. Andreaggi, Short Hills, N.J., assignor to Weston Instruments, Inc., Newark, N.J., a corporation of Delaware
Filed May 5, 1966, Ser. No. 547,884
Int. Cl. G01r 15/10, 1/14
U.S. Cl. 324—132          2 Claims

ABSTRACT OF THE DISCLOSURE

A projected indication meter having a cylindrical magnetic member within which is a moving coil operating on the D'Arsonval principle. The moving coil carries an arm which supports a scale. An optical system projects light through transparent or translucent portions of the scale and projects readings on a screen. The arm also carries a piece of permanent magnet material. An arcuate member, of magnetic material, is mounted on the cylindrical magnetic member surrounding the moving coil, the arcuate member having an upstanding portion which is also arcuate, which is concentric with the moving coil, and which has inwardly projecting teeth. When the input to the meter causes the moving coil to arrive at a region corresponding to the magnitude of the input, the permanent magnet and the teeth interact to move the arm and scale to a preselected scale position corresponding to a range of input values. In an alternative embodiment, the arcuate member includes upstanding segments of magnetic material in place of the teeth. In a further alternative embodiment, the arcuate member includes a single upstanding piece of permanent magnet material and the arm carries a plane member having segments of magnetically permeable material carried thereby. The apparatus produces indications of a digital nature.

This invention relates to an improved magnetic detent mechanism for electrical instruments, and in particular, to a D'Arsonval type of instrument which will detent the instrument's arm subassembly.

A typical electrical instrument employing the D'Arsonval principle includes a movable coil to which an input signal is applied. The coil is usually connected to an arm subassembly, such as a pointer arm and at least one leg of the coil is disposed in an air gap and is subjected to the influence of a magnetic field. The interaction between the current flowing in the coil and the magnetic field produces a torque which causes the coil and associated pointer arm to rotate about a pivotal axis.

Usually the arm subassembly cooperates with a suitable scale which continuously indicates the value of the input signal at any time. However, sometimes it is only necessary to know or use the approximate value of the input signal. For instance, if the input signal is equal or greater than 4.5 milliamperes but less than 5.5 milliamperes, it may be sufficient to indicate 5 milliamperes. Similarly, in another possible application, the present invention may be utilized to actuate an accessory device, such as a switch, whenever the arm subassembly is within a certain angular arc, such as 20°.

One means for accomplishing this result is to mount a detent plate having a plurality of units or tooth-like segments of magnetic material adjacent to the path of travel of the arm subassembly, a portion of the arm subassembly also being of a magnetic material. One embodiment of such a mechanism is shown in our copending application Ser. No. 547,966 filed on the same date as this application and assigned to the same assignee. However, it can be appreciated that the mounting of the horizontal plate disclosed in said application with respect to the arm subassembly must be very precise to insure that the proper scale reading or accessory device will be actuated when the arm subassembly is deflected through a certain angular arc.

Alignment of the detent plate can be made quite accurate and at the same time relatively simple and cheap by circumferentially mounting it directly to a part of the movable coil assembly; in particular, to a part of the movable coil assembly having a cylindrical surface which is concentric with any arc through which the arm subassembly rotates. One such part of the movable coil assembly is the soft iron yoke which serves the purpose of a return flux path from one pole of the magnet to the other magnetic pole.

Therefore, it is the object of this invention to provide an improved mechanism for detenting an arm subassembly of an electrical instrument.

It is another object of this invention to provide an improved magnetic mechanism for detenting the arm subassembly of an electrical instrument by mounting said mechanism to a cylindrical surface, such as the yoke of the instrument's movable coil assembly.

In accordance with these objects, a preferred embodiment of this invention includes an arm subassembly which is deflected along a path of travel in accordance with the typical D'Arsonval principle with a first magnetic member mounted thereon. Adjacent to the path of travel through which the first magnetic member moves as it is deflected, is a second magnetic member, hereinafter referred to as the detent plate. The second magnetic member is a portion of an annular cylinder circumferentially mounted to the yoke of the movable coil assembly. The second magnetic member has a plurality of units or tooth-like members, the arm subassembly being attracted to the particular tooth-like member to which it is closest whenever an input signal is applied thereto. A means is provided to return the arm subassembly to a zero position whenever the input signal is removed.

With these and other objects in mind, the features and advantages of the present invention will be best understood from the following description when taken in conjunction with the accompanying drawings in which:

FIG. 1 is a partial sectional view of a preferred embodiment of an electrical indicating instrument with a detent mechanism;

FIG. 2 is a top view of the movable coil assembly taken along lines 2—2 of FIG. 1;

FIG. 3 is a perspective view of the movable coil assembly with the preferred embodiment of the detent plate attached;

FIG. 4 is a perspective view of another embodiment of the detent plate; and

FIG. 5 is a perspective view of a portion of still another embodiment of the detent mechanism.

Referring to FIG. 1, an electrical indicating instrument is shown comprising a molded or die-cast framework 12, having a main horizontal portion 14. On block 16, which is an integral part of the horizontal portion 14, is mounted a movable coil assembly, generally designated as 18.

Referring to FIG. 2, the movable coil assembly 18 comprises a substantially cylindrical permanent magnet core 20, positioned within and spaced from a soft iron yoke 22 of an annular cross section which provides a return path for the magnetic flux of the magnetized core. The movable coil assembly 18 has a coil of wire 24 wound upon a coil frame 26 for rotation about a pivotal axis 28.

Referring to FIG. 3, an upper bearing (not shown) is mounted in upper bridge member 29, and a lower bearing (not shown) is mounted in a lower bridge member 30. The two bridge members 29 and 30 span the coil assembly 18, and are secured thereabout in any well-known manner. The coil frame 26 has attached thereto one upper and one lower pivot staff (not shown) which are supported in a well-known manner in the corresponding bearing. The bridge members 29 and 30 are designed to fit into the block 16 of the die-cast framework 12. The coil frame 26 with the coil of wire 24 thereon, moves in an arcuate path of travel as shown by the arrows 32–32. This movement varies with the magnitude of the current flowing in the coil of wire 24. The current is conducted to the coil of wire 24 through the spiral hairsprings 34 and 36, shown in FIG. 1, and well known in the art. The spiral hairsprings 34 and 36 also function to restore the coil of wire 24 to a normal zero position when no current is applied to the coil of wire.

A pointer arm 46 is mounted on the coil frame 26 for rotation therewith. The pointer arm 46 has a small piece of magnetic material 48, preferably of wedge-shaped configuration, attached to one end thereof. A detent plate 40 is secured to the soft iron yoke 22 by any well-known means such as a nut and ball arrangement 42 and 44. The detent plate 40 is in the form of a portion of an annular cylinder and has projecting therefrom a plurality of teeth 100, 101, 102, 103, 104, 105 and 106 (see FIG. 3). The geometric configuration of the teeth 100 through 106 depends on the desired characteristics of the instrument. The wedge 48 is radially positioned from the pivotal axis 28, such that when the coil of wire 24 is deflected, the wedge swings in an arc which is contiguous to the teeth 100–106. Preferably, the wedge 48 has a width which is less than the width of each tooth. Either the wedge 48 is a permanent magnet and the teeth 100–106 are made of a material of high magnetic permeability or vice versa.

It is very important that the air gap, shown by the distance X on FIG. 2, between the end of the magnetic wedge 48 and each tooth 100 through 106 of the detent plate 40, be uniform in order to achieve predictable magnetic registry. This problem is greatly simplified by circumferentially mounting the cylindrically-shaped detent plate 40 onto the cylindrically-shaped yoke 22. Since the cylindrical surface of the yoke 22 is concentric to any arc through which the pointer arm 46 is detented, the problem of accurately aligning the detent plate 40 is greatly simplified. The dimensions of the yoke 22 are maintained fairly accurate and concentric for several reasons. First of all, usually the movable coil assembly of any particular instrument is mounted to an instrument housing by clamping brackets, such as the bridge members 29 and 30, about the yoke and such mounting must be accurate if there is to be proper alignment of the movable coil assembly. Also, the dimensions of the yoke have some effect on the uniformity of the flux density across the air gap.

The pointer arm 46 has an upwardly directed portion 50 to which is secured an arcuate scale strip 52, well known in the art, upon which are disposed a number of characters such as the digits 0, 1, 2 . . . 9 which are to be displayed. The strip 52 is preferably opaque except for the displayed characters which are transparent, but the alternative of opaque characters upon a transparent strip may also be employed if desired. Similarly, colored characters or strips may be used. The scale strip with its characters is preferably formed by a photographic process.

A projection lamp 54 is mounted so that the light from the lamp 54 is condensed on the scale strip 52 by an optical lens system 60 which may be of a plano-convex type. The light then passes through another lens 62 and is reflected by suitable prism 64 onto a translucent screen image plate 66. Further details of this optical projection system are disclosed in a copending application, Ser. No. 480,740 filed Aug. 18, 1965, and assigned to the same assignee.

In operation, when the pointer arm 46 is at its rest position, the wedge 48 is in very close proximity to tooth 100 (FIG. 3). As the current is passed through the coil of wire 24, such that the torque produced will make the pointer arm 46 rotate in a clockwise direction as shown by the arrow 33 in FIG. 3, the pointer arm 46 will swing past another tooth such as 104. If the torque is not strong enough to move the arm over to the next tooth 105, depending upon the position of the wedge 48 relative to teeth 104 and 105, the wedge 48 will be attracted either to the tooth 104 or to the tooth 105. The teeth 100–106 and the wedge 48 can be designed so that when the current is within a predetermined range of values, for instance, equal to or greater than 4.5 milliamperes and less than 5.5 milliamperes, the wedge 48 will be attracted to tooth 105 rather than tooth 104 or 106. These numbers are arbitrary and different numbers and ranges or other selected indicia could be selected by properly shaping and positioning the teeth and the wedge. When the current is removed, the pointer arm 46 is returned to its original position, in close proximity to tooth 100 due to the action of the spiral hairsprings 34 and 36.

In another embodiment of the detent mechanism, as shown in FIG. 4, the detent plate 240 has a solid lower portion which is mounted to the yoke 22 by a nut and bolt arrangement and the upper portion comprises a plurality of strips 200, 201, 202, 203, 204, 205 and 206. The interaction between the upper tip of the strips 200–206 and the wedge 48 is substantially the same as described with respect to the first embodiment.

In a third embodiment, as shown in FIG. 5, a detent plate 340 of magnetic material, which has only one unit or tooth-like member 348, is mounted onto the yoke 22. A plurality of units 300, 301, 302, 303, 304, 305 and 306 in the form of magnetic strips, such as lines of magnetic ink, are mounted on the scale strip 52. The detent plate 340 is mounted so that its single unit or tooth-like member 348 is contiguous to the scale plate 52 and the interaction between this single unit 348 and the plural units or strips 300–306 on the scale plate is substantially the same as described with respect to the first embodiment.

What is claimed is:

1. Apparatus for indicating the value of a measured parameter comprising, a scale having indicia thereon representing different parameter values; rotatable mechanism mounting said scale for rotation in an arcuate plane about an axis of rotation of said mechanism, said mechanism being responsive to said parameter for rotating said scale through an arc determined by the value of said parameter; a plurality of strips mounted on said scale in predetermined positions relative to certain of said indicia, said strips being characterized as having good magnetic permeability, a magnet mounted stationary on the apparatus substantially in said plane of scale rotation and extending closely proximate to, but spaced from, said scale so as to magnetically attract and thereby constrain one of said strips upon rotation of said scale to a position where the one strip is essentially opposite said magnet.

2. Apparatus according to claim 1 wherein said mechanism comprises a magnetized core member and a coil assembly mounted for rotation about a portion of said core member, a yoke member having good magnetic permeability mounted on said core member so as to provide a flux return path between different magnetic poles of said core member, and further, wherein said magnet comprises a member formed of magnetic material mounted on said yoke member opposite one of the core member poles.

References Cited

UNITED STATES PATENTS

| | | | |
|---|---|---|---|
| 2,305,974 | 12/1942 | Matthews | 310—103 X |
| 3,026,478 | 3/1962 | De Mott et al. | |
| 3,159,759 | 12/1964 | Conrad et al. | 310—103 |
| 3,177,788 | 4/1965 | Prinsen | 324—132 X |
| 3,317,836 | 5/1967 | Welsh | 324—97 XR |

FOREIGN PATENTS 1,007,932  10/1965  Great Britain.

ALFRED E. SMITH, Primary Examiner

U.S. Cl. X.R.

324—125, 151; 335—222, 274